United States Patent
Xie et al.

(10) Patent No.: US 10,018,881 B2
(45) Date of Patent: Jul. 10, 2018

(54) FRINGE-FIELD-SWITCHING MODE LIQUID CRYSTAL DISPLAY PANEL WITH DOUBLE-SIDED ELECTRODE STRUCTURE

(71) Applicant: BOE TECHNOLOGY GROUP CO., LTD., Beijing (CN)

(72) Inventors: Chang Xie, Beijing (CN); Jaegeon You, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 140 days.

(21) Appl. No.: 13/703,502

(22) PCT Filed: Sep. 19, 2012

(86) PCT No.: PCT/CN2012/081608
§ 371 (c)(1),
(2) Date: Dec. 11, 2012

(87) PCT Pub. No.: WO2013/060208
PCT Pub. Date: May 2, 2013

(65) Prior Publication Data
US 2014/0049732 A1 Feb. 20, 2014

(30) Foreign Application Priority Data
Oct. 25, 2011 (CN) .................... 2011 2 0411249 U

(51) Int. Cl.
*G02F 1/137* (2006.01)
*G02F 1/1343* (2006.01)

(52) U.S. Cl.
CPC .. *G02F 1/134363* (2013.01); *G02F 1/134309* (2013.01); *G02F 2001/13793* (2013.01); *G02F 2001/134372* (2013.01)

(58) Field of Classification Search
CPC combination set(s) only.
See application file for complete search history.

(56) References Cited

U.S. PATENT DOCUMENTS

| 7,929,097 B1 | 4/2011 | Choi et al. |
| 2004/0263749 A1* | 12/2004 | Jeong et al. ................ 349/141 |

(Continued)

FOREIGN PATENT DOCUMENTS

| CN | 101201484 A | 6/2008 |
| CN | 10-1718928 | * 6/2010 |

(Continued)

OTHER PUBLICATIONS

Korean Office Action Appln. No. 10-2012-7031824; dated Aug. 29, 2014.

(Continued)

*Primary Examiner* — Lauren Nguyen
(74) *Attorney, Agent, or Firm* — Ladas & Parry LLP

(57) ABSTRACT

Embodiments of the present invention provide a fringe-field-switching mode liquid crystal display panel. The liquid crystal display panel comprises: a first substrate and a second substrate facing each other, and a liquid crystal layer sandwiched between the first substrate and the second substrate; a first lower electrode, a first insulating layer and a first upper electrode, which are formed sequentially on a surface of the first substrate facing the second substrate; and a second lower electrode, a second insulating layer and a second upper electrode, which are formed sequentially on a surface of the second substrate facing the first substrate.

10 Claims, 4 Drawing Sheets

(56) References Cited

U.S. PATENT DOCUMENTS

2005/0052603 A1* 3/2005 Jin .................. G02F 1/134363
                                                    349/141
2010/0302492 A1* 12/2010 Kubota et al. ............... 349/138
2011/0249229 A1* 10/2011 Kubota et al. ............... 349/141

FOREIGN PATENT DOCUMENTS

| CN | 101718928 A | 6/2010 |
|---|---|---|
| CN | 101900913 A | 12/2010 |
| CN | 101943829 A | 1/2011 |
| CN | 102087446 A | 6/2011 |
| JP | 2002-049049 A | 2/2002 |
| JP | 2004-354407 A | 12/2004 |
| JP | 2007-171740 A | 7/2007 |
| JP | 2010-066645 A | 3/2010 |
| JP | 2010-519587 A | 6/2010 |
| JP | 2011-008239 | 1/2011 |
| KR | 20100129200 A | 12/2010 |
| KR | 20110114466 A | 10/2011 |

OTHER PUBLICATIONS

International Preliminary Report on Patentability dated Apr. 29, 2014; PCT/CN2012/081608.
International Search Report: dated Dec. 13, 2012; PCT/CN2012/081608.
Korean Non-Final Rejection Notice dated Jan. 29, 2014; Appln. No. 10-2012-7031824.
Korean Final Office Action Appln. No. 10-2012-7031824; dated Nov. 10, 2014.
Korean Office Action dated Apr. 2, 2015; Appln. No. 10-2014-7034740.
Extended European Search Report dated May 29, 2015; Appln. No. 12790774.9-1904/2775346; PCT/CN2012081608.
Koren Office Action Appln. No. 10-2014-7034740; dated Oct. 31, 2015.
Japanese Office Action dated May 9, 2016: Appln. No. 2014-537466.
First European Office Action dated Jan. 25, 2017; Appln. No. 12 790 774.9-1914.
First Japanese Office Action dated Feb. 6, 2017; Appln. No. 2014-537466.
The Second Office Action issued by the European Patent Office dated Jul. 10, 2017; Appln. 12 790 774.9.

* cited by examiner

FRINGE-FIELD-SWITCHING MODE LIQUID CRYSTAL DISPLAY PANEL WITH DOUBLE-SIDED ELECTRODE STRUCTURE

CROSS REFERENCE TO RELATED APPLICATIONS

This application is a national stage application under 35 U.S.C. 371 and claims the benefit of PCT Application No. PCT/CN2012/081608 having an international filing date of Sep. 19, 2012, which designated the United States, which PCT application claimed the benefit of Chinese Application No. 201120411249.3 filed Oct. 25, 2011, the disclosure of each of which are incorporated herein by reference.

FIELD OF THE INVENTION

Embodiments of the present invention relate to a fringe-field-switching mode liquid crystal display panel.

BACKGROUND OF THE INVENTION

In recent years, liquid crystal display technology has been developed very rapidly. In the prior art, there have been developed various liquid crystal display panels such as In-Plane-Switching (IPS) mode and Fringe-Field-Switching (FFS) mode liquid crystal display panels.

FIG. 1 illustrates a schematic structural diagram of a FFS blue-phase liquid crystal display panel in the prior art. It comprises in sequence from the top to the bottom: an upper polarizer 101, an upper substrate 102, a liquid crystal layer 103, a pixel electrode 104, an insulating layer 105, a common electrode 106, a lower substrate 107 and a lower polarizer 108. In FIG. 1, the lower substrate is provided thereon with the common electrode 106 and the pixel electrode 104, and the pixel electrode 104 may be a comb-like electrode, comprising a plurality of comb-teeth parts parallel to each other.

Parameters such as response time, driving voltage and light-transmittance and the like are important factors affecting the performances of a liquid crystal display panel display. Therefore, it is always being concerned in the industry on how to design a liquid crystal display panel with a short response time, small driving voltage and high light-transmittance.

SUMMARY OF THE INVENTION

An embodiment of the present invention provides a fringe-field-switching mode liquid crystal display panel, comprising: a first substrate and a second substrate facing each other, and a liquid crystal layer sandwiched between the first substrate and the second substrate; a first lower electrode, a first insulating layer and a first upper electrode, which are formed sequentially on a surface of the first substrate facing the second substrate; and a second lower electrode, a second insulating layer and a second upper electrode, which are formed sequentially on a surface of the second substrate facing the first substrate.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment (s), without any inventive work, which should be within the scope of the invention.

Based on a traditional FFS electrode structure, the embodiments of the present invention are designed to be a liquid crystal display panel having a double-sided FFS electrode structure. The liquid crystal display panel having such a structure can bring about an intenser effective transverse electric field, which can improve the light-transmittance, reduce the driving voltage, and reduce the response time. Also, such a structure can automatically compensate for an optical path difference, so that the display has a wider viewing angle. Hereinafter, in connection with the accompanying drawings, the present invention will be further explained by referring to specific embodiments.

Figure 2:
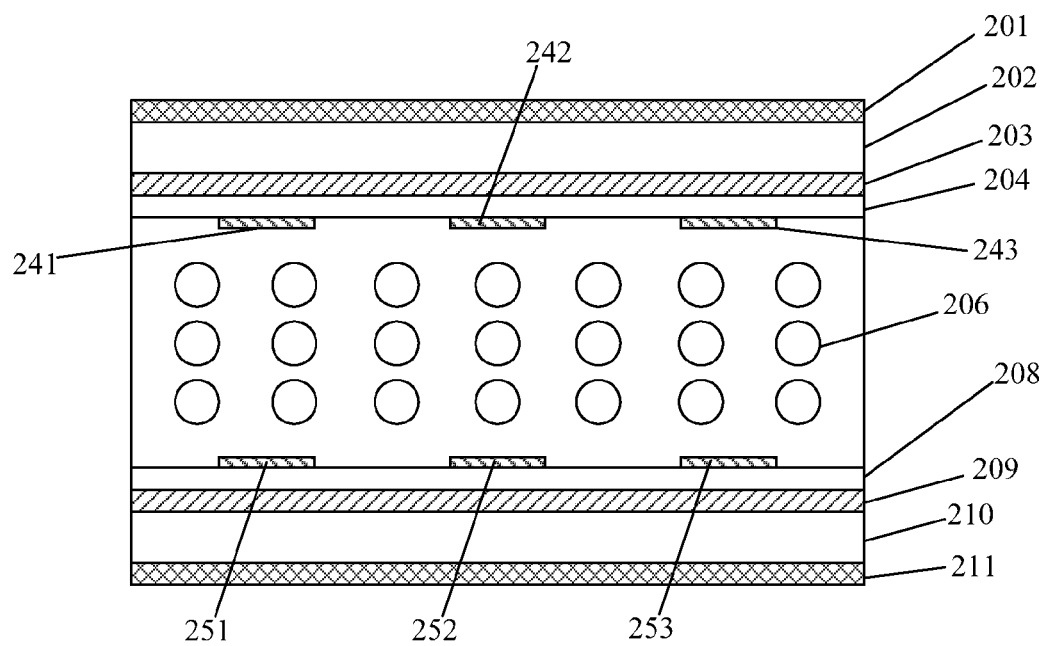
FIG. 2 is a schematic structural diagram of a liquid crystal display panel according to an embodiment of the present invention.

With reference to FIG. 2, it shows a fringe-field-switching mode liquid crystal display panel according to an embodiment of the present invention, which comprises:

An upper substrate 202, a lower substrate 210, and a liquid crystal layer 206 sandwiched between the upper substrate 202 and the lower substrate 210.

On a lower surface of the upper substrate 202, there are formed sequentially from top to bottom with a first common electrode 203, a first insulating layer 204 and a first pixel electrode; on an upper surface of the lower substrate 210, there are formed sequentially from bottom to top with a second common electrode 209, a second insulating layer 208 and a second pixel electrode.

In this embodiment, both the first pixel electrode and the second pixel electrode may be comb-like electrodes, each comprising a plurality of comb-teeth parts parallel to each other. The first pixel electrode comprises a plurality of strip-like comb-teeth-shaped first sub-electrodes 241, 242, 243 parallel to each other, and the second pixel electrode also comprises a plurality of strip-like comb-teeth-shaped second sub-electrodes 251, 252, 253 parallel to each other. The specific structures of the first pixel electrode and the second pixel electrode may the same as the structure of a pixel electrode of a fringe-field-switching mode liquid crystal display panel in the prior art. Certainly, in FIG. 2, it may also comprise an upper polarizer 201 provided above the upper substrate 202 and a lower polarizer 211 provided below the lower substrate 210 as in the prior art.

As it can be seen, the liquid crystal display panel in this embodiment has both the upper and the lower substrates provided thereon with a pixel electrode and a common electrode, and the pixel electrode and the common electrode are separated by an insulating layer. Through simulation, it can be found that, after both the upper and the lower substrates are provided with the pixel electrode and the common electrode, an intenser effective transverse electric field can be formed between the pixel electrode and the common electrode on each substrate, so that the liquid crystal are more prone to a transversal deflection, thus a rapid deflection of the liquid crystal can be achieved in the case of a relatively low driving voltage, and therefore can improve the light-transmittance, reduce the driving voltage, and also can reduce the response time of the liquid crystal display panel. Meanwhile, such a vertically symmetrical structure can automatically compensate for an optical path difference, so that a wider viewing angle of the liquid crystal display panel can be obtained.

In recent years, in order to enhance the display quality of a liquid crystal display, and to achieve a higher contrast, a faster response time and a wider viewing angle, a blue-phase liquid crystal material with a fast response characteristic is gradually gaining more attention. The blue phase is a liquid crystal phase between an isotropic phase and a cholesteric phase, which exists in a very narrow range of temperature, only a temperature zone of about 1° C. However, in recent years, it is found that the temperature range in which the blue-phase liquid crystal can exist will be greatly broadened after polymer-stabilization, which can basically meet the temperature range for being used as a liquid crystal display material. The blue-phase liquid crystal display device as the most potential next-generation display, has the following revolutionary characteristics: (1) in the case that no voltage is applied, the blue-phase liquid crystal is isotropic, and a blue-phase liquid crystal display has features such as a wide viewing angle and a good dark-state; (2) the theoretical response time of the blue-phase liquid crystal display can reach to below milliseconds, thus the response time is greatly improved; (3) because of the stability of the blue-phase liquid crystal polymer, which is isotropic in the case that no voltage is applied, it does not require an alignment layer which is necessary in other various liquid crystal display modes, therefore the manufacturing cost is reduced, and the manufacturing process is simplified.

Figure 1:
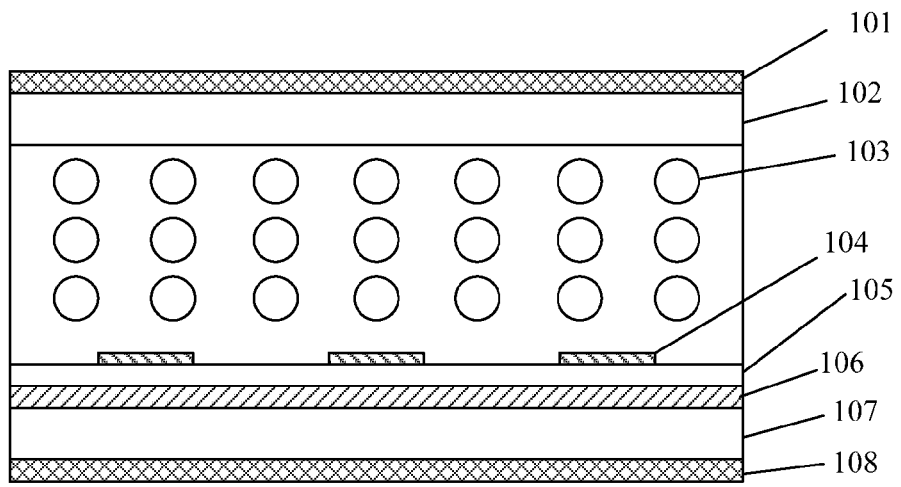
FIG. 1 is a schematic structural diagram of a FFS blue-phase liquid crystal display panel in the prior art.

In the structure shown in FIG. 1, if the blue-phase liquid crystal is used as a liquid crystal layer, the blue-phase liquid crystal layer will be in an isotropic state when no power is supplied, and when power is supplied, there will be an electric field with the intensity gradually reduced from the lower substrate to the upper substrate; therefore, the blue-phase liquid crystal close to the lower substrate will have a significant change in the effect of the electric field, while the blue-phase liquid crystal close to the upper substrate are less affected by the electric field and do no change significantly. Therefore, the structure shown in FIG. 1 has a low light efficiency, and thus a drive voltage is required to be enhanced for improving the light efficiency, thereby increasing the power consumption of the panel. As it can be seen, the existing blue-phase liquid crystal display panel has two difficult technical problems: a high driving voltage and a low light efficiency. At present, in producing processes, a conventional IPS pixel driving mode is employed to drive the blue-phase liquid crystal display panel, and a method of improving the Kerr constant of the blue-phase liquid crystal material is commonly used to reduce the driving voltage, which however has a high demand on the material.

As for the present embodiment on the basis of the above-described structure, since it is capable of forming an intenser and more uniform effective transverse electric field when the material of the liquid crystal layer 207 is the blue-phase liquid crystal, so that the blue-phase liquid crystal are more prone to a transverse deflection, thus a rapid deflection of the blue-phase liquid crystal can be achieved in the case of a relatively low driving voltage. Therefore, the structure according to the embodiment of the present invention can improve the light-transmittance, reduce the driving voltage, and can also reduce the response time of the blue-phase liquid crystal display panel, and thus can excellently improve the drawbacks of the blue-phase liquid crystal display panel in the prior art.

Here, materials that can be employed in the liquid crystal display panel of the embodiment will be explained with examples. The materials and their parameters as below are merely employed for one of the embodiments of the present invention, but not for limiting the present invention: the first pixel electrode, the first common electrode 203, the second common electrode 209, and the second pixel electrode all may be made from a material of indium tin oxide (ITO); the first insulating layer 204 and the second insulating layer 208 may be made from a material for an insulating layer or a passivation layer; and a set of parameters of the blue-phase liquid crystal material are as follows: the horizontal dielectric constant $\in_{//}=37$, the perpendicular dielectric constant $\in_{\perp}=4$, the refractive index of a fast axis $n_o=1.4744$, the refractive index of a slow axis $n_e=1.7744$, the Kerr constant $K=1.268$ nm/$V^2$ ($\lambda=550$ nm) (where, V is a voltage unit volt, and $\lambda$ is a wavelength).

In one embodiment, the first pixel electrode comprises a plurality of first sub-electrodes parallel to each other, and the first sub-electrodes may be strip-like electrodes; the second pixel electrode comprises a plurality of second sub-electrodes parallel to each other, and the second sub-electrodes may be strip-like electrodes.

In one embodiment, the extending direction of the first sub-electrodes on the upper substrate is the same as the extending direction of the second sub-electrodes on the lower substrate.

In one embodiment, the strip-like first sub-electrodes on the upper substrate are provided opposed to the strip-like second sub-electrodes on the lower substrate, respectively.

In order to further improve the display performance of the liquid crystal display panel, in this embodiment, the lower surface of the upper substrate may be provided with a plurality of first supporting portions parallel to each other and protruding downwardly, with first upwardly-concave grooves being constituted between the adjacent first supporting portions; alternatively, the upper surface of the lower substrate may be provided with a plurality of second supporting portions parallel to each other and protruding upwardly, with a second downwardly-concave groove being constituted between the adjacent second supporting portions. Certainly, this embodiment may also have both the upper and the lower substrates simultaneously provided with the above-described first supporting portions and second supporting portions, respectively. Here, both the first supporting portions and the second supporting portions may be made of an organic resin material.

After the upper substrate is provided thereon with the first supporting portions, in this embodiment, the lower surface of the upper substrate comprising the first supporting portions may be formed thereon sequentially with the first common electrode, the first insulating layer and the first pixel electrode. That is, the first supporting portions are provided between the first substrate and the first common electrode. The first sub-electrodes are provided at intervals below the first supporting portions, that is, provided corresponding to the first supporting portions. Certainly, as another alternative implementation, the first sub-electrodes may be provided at intervals below the first grooves, that is, provided corresponding to the first grooves.

After the lower substrate is provided thereon with the second supporting portions, in this embodiment, the upper surface of the lower substrate comprising the second supporting portions may be formed thereon sequentially with the second common electrode, the second insulating layer and the second pixel electrode. That is, the second supporting portions are provided between the second substrate and the second common electrode. The second sub-electrodes are provided at intervals above the second supporting portions, that is, provided corresponding to the second supporting portions. Certainly, as another alternative implementation, the second sub-electrodes may be provided at intervals above the second grooves, that is, provided corresponding to the second grooves.

In this embodiment, the first supporting portions and the second supporting portions all may be strip-like supporting portions, for example, the extending direction of the strip-like supporting portions may be the same as the extending direction of the above-described strip-like sub-electrodes. The first supporting portions and the second supporting portions may have a cross-section in a rectangular, trapezoidal, semicircular, triangular or semi-elliptical or other shape. Preferably, the second supporting portions may have the same cross-sectional shape as the first supporting portions.

In one embodiment, the size and the interval of the first supporting portions are equal to the size and the interval of the second supporting portions, respectively.

In one embodiment, the second supporting portions and the first supporting portions are provided oppositely, or the second supporting portions are provided opposite to the first grooves. Here, the second supporting portions and the first supporting portions being provided oppositely means that, the second supporting portions are located directly below the first supporting portions; the second supporting portions and the first grooves being provided oppositely means that, the second supporting portions are located directly below the first grooves.

In one embodiment, the first common electrode has a uniform layer thickness, the first insulating layer also has a uniform layer thickness, the first pixel electrode also has a uniform layer thickness, the second common electrode also has a uniform layer thickness, moreover, the second insulating layer also has a uniform layer thickness, and the second pixel electrode also has a uniform layer thickness.

It can be seen from the above that, in this embodiment, by providing the upper substrate and/or the lower substrate with supporting portions protruding toward the liquid crystal layer, it makes the common electrode and the insulating layer which are formed sequentially on the supporting portions protrude toward the liquid crystal layer, and then a pixel electrode is further formed on the protruding insulating layer or a pixel electrode is formed in grooves between the protruding insulating layer. Such a structure can reduce the distance from the pixel electrode to the common electrode between the upper and the lower substrates, so that the electric field lines between the upper and the lower substrates are denser (the electric field are intenser), thus a deflection of the liquid crystal can be achieved with a small driving voltage being applied, thereby it can further reduce the driving voltage of the liquid crystal display panel, improve its response speed, and improve the light-transmittance, and furthermore improve the display performance of the liquid crystal display panel.

Finally, with two specific structural diagrams of FIGS. 3 to 4, the liquid crystal display panel having the first supporting portions and the second supporting portions provided in the embodiment of the present invention will be explained in more detail.

Figure 3:
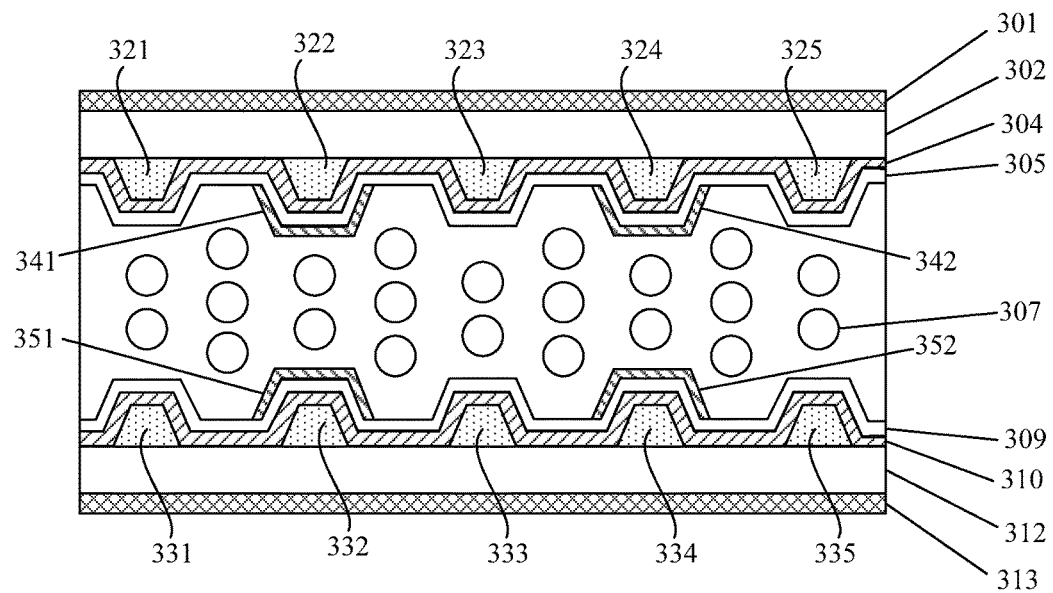
FIG. 3 is a schematic structural diagram of another liquid crystal display panel according to an embodiment of the present invention.

With reference to the liquid crystal display panel shown in FIG. 3, the liquid crystal display panel comprises:

An upper substrate 302, a lower substrate 312, and a liquid crystal layer 307 sandwiched between the upper substrate 302 and the lower substrate 312; in FIG. 3, it may also comprise an upper polarizer 301 and a lower polarizer 313.

In FIG. 3, on a lower surface of the upper substrate 302, there are provided with a plurality of first supporting portions 321, 322, 323, 324, and 325 parallel to each other and protruding downwardly, with first upwardly-concave grooves being constituted between the adjacent first supporting portions. These first supporting portions may be in an elongate strip shape and parallel to each other. In FIG. 3, the first supporting portions 321, 322, 323, 324, and 325 all have a cross-section in a top-wide-and-bottom-narrow trapezoidal shape.

The lower surface of the upper substrate 302 comprising the first supporting portions is formed thereon sequentially with a first common electrode 304, a first insulating layer 305 and a first pixel electrode. The first pixel electrode comprises a plurality of first sub-electrodes parallel to each other, and only the first sub-electrodes 341 and 342 are illustrated in FIG. 3. The first sub-electrodes may be strip-like electrodes, and the first sub-electrode 341 is provided below the first supporting portion 322, while the first sub-electrode 342 is provided below the first supporting portion 324. As it can be seen, the first sub-electrodes are provided at intervals below the first supporting portions. Preferably, the first sub-electrodes are provided at intervals directly below the first supporting portions. Certainly, as another alternative implementation, the first sub-electrodes may also be provided at intervals below (or directly below) the first grooves.

In FIG. 3, on the upper surface of the lower substrate 312, there are provided with a plurality of second supporting portions 331, 332, 333, 334, and 335 parallel to each other and protruding upwardly, and these second supporting portions may be in an elongate strip shape and parallel to each other. A second downwardly-concave groove is constituted between the adjacent second supporting portions. In FIG. 3, the second supporting portions 331, 332, 333, 334, and 335 all have a cross-section in a bottom-wide-and-top-narrow trapezoidal shape.

The upper surface of the lower substrate 312 comprising the second supporting portions is formed thereon sequentially with a second common electrode 310, a second insulating layer 309 and a second pixel electrode. The second pixel electrode comprises a plurality of second sub-electrodes parallel to each other, and only the second sub-electrode 351 and 352 are shown in FIG. 3. The second sub-electrodes may be strip-like electrodes, and the second sub-electrodes 351 is provided above the second supporting portion 332, while the second sub-electrode 352 is provided above the second supporting portion 334. As it can be seen, the second sub-electrodes are provided at intervals above the second supporting portions. Preferably, the second sub-electrodes are provided at intervals directly above the second supporting portions. Certainly, as another alternative implementation, the second sub-electrodes may also be provided at intervals above (or directly above) the second grooves.

In FIG. 3, the first insulating layer 305 on the lower surface of the upper substrate 302 may cover on the first common electrode 304, and the second insulating layer 309 on the upper surface of the lower substrate 312 may cover on the second common electrode 310. In one embodiment, the first common electrode 304 and the first insulating layer 305 are conformally formed on the upper substrate 302 having the first supporting portions; the second common electrode 310 and the second insulating layer 309 are conformally formed on the lower substrate 312 having the second supporting portions.

In FIG. 3, the first supporting portions 321, 322, 323, 324, and 325 are provided opposite to the second supporting portions 331, 332, 333, 334, and 335, respectively; that is, the first supporting portions 321, 322, 323, 324, and 325 are provided directly above the second supporting portions 331, 332, 333, 334, and 335, respectively. In this case, the first sub-electrode 341 and the second sub-electrode 351 are provided oppositely, meanwhile, the first sub-electrode 342 and the second sub-electrode 352 are provided oppositely; that is, the first sub-electrodes 341 and 342 are provided directly above the second sub-electrodes 351 and 352, respectively.

In FIG. 3, the upper and the lower substrates are adhesively bonded together by sealant, and the employed polarizer and polarization analyzer are the same type of polarizer.

Figure 4:
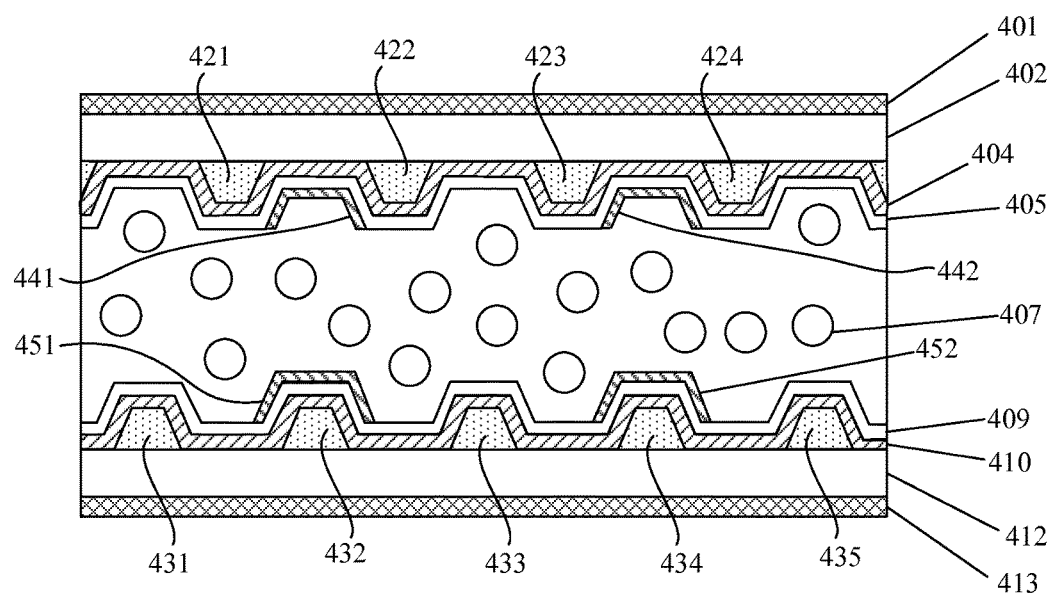
FIG. 4 is a schematic structural diagram of yet another liquid crystal display panel according to an embodiment of the present invention.

In the liquid crystal display panel shown in FIG. 4, the first supporting portions and the second supporting portions are disposed in a stagger manner, with specific reference to FIG. 4, and the liquid crystal display panel comprises:

An upper substrate 402, a lower substrate 412, and a liquid crystal layer 407 sandwiched between the upper substrate 402 and the lower substrate 412; in FIG. 4, it may also comprise an upper polarizer 401 and a lower polarizer 413.

In FIG. 4, on a lower surface of the upper substrate 402, there are provided with a plurality of first supporting portions 421, 422, 423, and 424 parallel to each other and protruding downwardly, with first upwardly-concave grooves being constituted between the adjacent first supporting portions. These first supporting portions may be in an elongate strip shape and parallel to each other. In FIG. 4, the first supporting portions 421, 422, 423, and 424 all have a cross-section in a top-wide-and-bottom-narrow trapezoidal shape.

The lower surface of the upper substrate 402 comprising the first supporting portions is formed thereon sequentially with a first common electrode 404, a first insulating layer 405 and a first pixel electrode. The first pixel electrode comprises a plurality of first sub-electrodes parallel to each other, and only the first sub-electrodes 441 and 442 are shown in FIG. 4. The first sub-electrodes may be strip-like electrodes, and the first sub-electrode 441 is provided below the first grooves, while the first sub-electrode 442 is provided at an interval below another first groove. As it can be seen, the first sub-electrodes are provided at intervals below the first grooves. Preferably, the first sub-electrodes are provided at intervals directly below the first grooves. Certainly, as another alternative implementation, the first sub-electrodes may also be provided at intervals below (or directly below) the first supporting portions.

In FIG. 4, on an upper surface of the lower substrate 412, there are provided with a plurality of second supporting portions 431, 432, 433, and 434 parallel to each other and protruding upwardly, and these second supporting portions may be in an elongate strip shape and parallel to each other. A downwardly-concave second groove is constituted between the adjacent second supporting portions. In FIG. 4, the second supporting portions 431, 432, 433, and 434 all have a cross-section in a bottom-wide-and-top-narrow trapezoidal shape.

The upper surface of the lower substrate 412 comprising the second supporting portions is formed thereon sequentially with a second common electrode 410, a second insulating layer 409 and a second pixel electrode. The second pixel electrode comprises a plurality of second sub-electrodes parallel to each other, and only the second sub-electrodes 451 and 452 are shown in FIG. 4; the second sub-electrodes may be strip-like electrodes, and the second sub-electrode 451 is provided above the second supporting portion 432, while the second sub-electrode 452 is provided above the second supporting portion 434. As it can be seen, the second sub-electrodes are provided at intervals above the second supporting portions. Preferably, the second sub-electrodes are provided at intervals directly above the second supporting portions. Certainly, as another alternative implementation, the second sub-electrodes may also be provided at intervals above (or directly above) the second grooves.

In FIG. 4, the first supporting portions 421, 422, 423, and 424 are not provided opposite to the second supporting portions 431, 432, 433, and 434, respectively; instead, they are provided opposite to the four second grooves that are constituted by the adjacent two second supporting portions among the second supporting portions 431, 432, 433, 434, and 435. In this case, the first sub-electrode 441 and the second sub-electrode 451 are provided oppositely, the first sub-electrode 442 and the second sub-electrode 452 are provided oppositely; that is, the first sub-electrodes 441 and 442 are provided directly above the second sub-electrodes 451 and 452, respectively. In FIG. 4, the first supporting portions 421, 422, 423, and 424 are provided diagonally with respect to the second supporting portions 431, 432, 433, and 434.

The structures shown in FIGS. 3 and 4 can make the transverse electric field between the pixel electrode and the common electrode more dense, thereby improving the display performance of the liquid crystal display panel.

Figure 5:
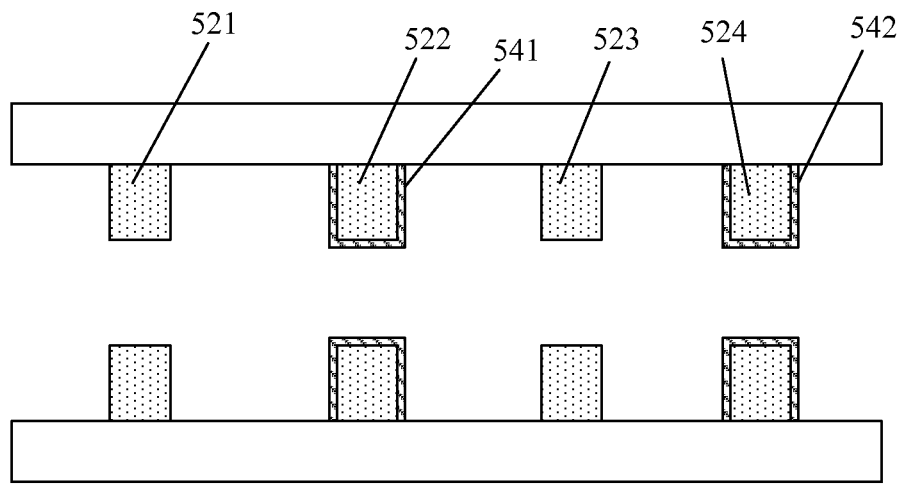
FIG. 5 is a schematic structural diagram of a supporting portion employed in an embodiment of the present invention.
Figure 6:
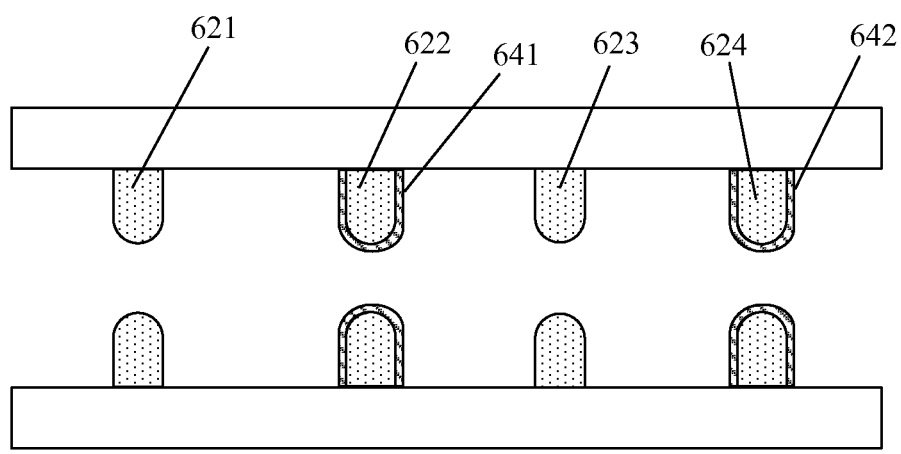
FIG. 6 is a schematic structural diagram of another supporting portion employed in an embodiment of the present invention.
Figure 7:
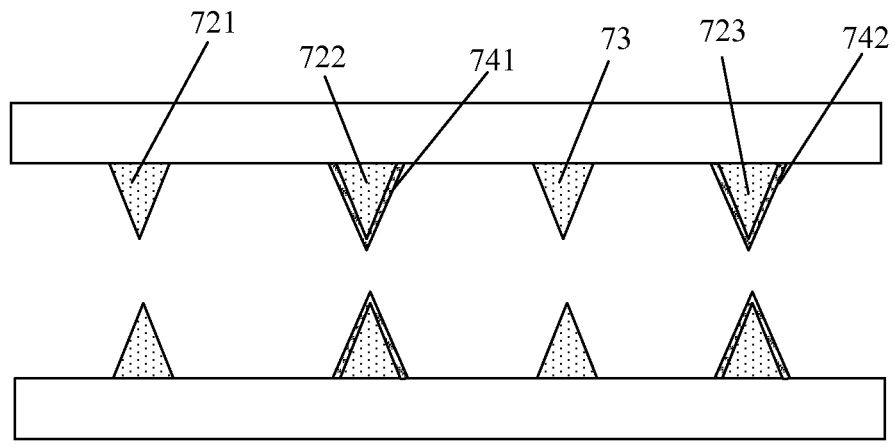
FIG. 7 is a schematic structural diagram of yet another supporting portion employed in an embodiment of the present invention.

Next, with reference to FIGS. 5-7, the figures respectively illustrate different structures of the supporting portions, and for simplicity, only the supporting portions and the pixel electrode are shown. In these figures, the supporting portions of the upper and the lower substrates are provided symmetrically, and certainly, in this embodiment, the supporting portions of the upper and the lower substrates may also be provided diagonally with respect to each other.

In FIG. 5, the supporting portions 521, 522, 523, 524 have a cross-section in a rectangular shape, and on these supporting portions, there are provided at intervals with sub-electrodes 541, 542 of a pixel electrode (for simplicity, some layer structures such as the common electrode and the insulating layer are not shown in the figure).

In FIG. 6, the supporting portions 621, 622, 623, 624 have a cross-section in a semi-elliptical shape, and on these supporting portions, there are provided at intervals with sub-electrodes 641, 642 of a pixel electrode (for simplicity, some layer structures such as the common electrode and the insulating layer are not shown in the figure).

In FIG. 7, the supporting portion 721, 722, 723, 724 have a cross-section in a triangular shape, and on these supporting portions, there are provided at intervals with sub-electrodes 741,742 of a pixel electrode (for simplicity, some layer structures such as the common electrode and the insulating layer are not shown in the figure).

In this embodiment, each layer of the upper and the lower substrates has a uniform layer thickness. Here, an optional parametric range of individual layer thickness will be given. The first common electrode and second common electrode have a thickness in a range of: 300 angstroms to 2500 angstroms; the first insulating layer and the second insulating layer have a layer thickness in a range of: 5000 to 10000 angstroms; the first pixel electrode (comprising the first sub-electrodes) and the second pixel electrode (comprising the second sub-electrodes) have a layer thickness in a range of: 300 angstroms to 2500 angstroms; the liquid crystal layer have a layer thickness in a selectable range of: $d=5$-$20$ $\mu m$.

Figure 8:
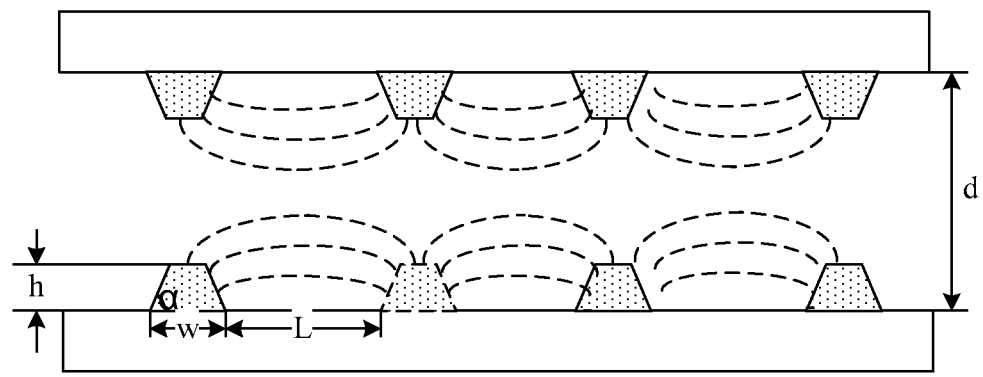
FIG. 8 is a schematic diagram of the structural parameters of the liquid crystal display panel shown in FIG. 3.

Finally, with reference to FIG. 8, it illustrates preferred structural parameters that may be employed in the embodiment shown in FIG. 3. For simplicity, in FIG. 8, some layer structures are omitted. FIG. 8 gives a description with the supporting portions in a trapezoidal structure.

The base width of the trapezoidal supporting portions, the spacing between the adjacent trapezoidal supporting portions, the height of the trapezoidal supporting portions, the inclination angle of the legs of the trapezoidal supporting portions for the interior surface (i.e. the lower surface) of the upper substrate, are respectively set equally to the base width of the trapezoidal supporting portions, the spacing between the adjacent trapezoidal supporting portions, the height of the trapezoidal supporting portions, the inclination angle of the legs of the trapezoidal supporting portions for the interior surface (i.e. the upper surface) of the lower substrate. Here, the "base" refers to the wider one of the upper base and the lower base in the trapezoidal cross-section of the trapezoidal supporting portions. The base has a width, for example, in a range of: $w=1$-$4$ $\mu m$; the spacing between the adjacent trapezoidal supporting portions is, for example, in a range of: $L=1$-$6$ $\mu m$; the height of the trapezoidal supporting portion is, for example, in a range of: $h=0.5$-$1$ $\mu m$; the inclination angle $\alpha$ of the legs of the trapezoidal supporting portions is, for example, in a range of: $\alpha=40$-$50°$. A thickness of a preferred layer structure provided by his embodiment is as follows: the thickness of the blue-phase liquid crystal layer is, for example, in a range of $d=5$-$20$ $\mu m$. The blue-phase liquid crystal material in the blue-phase liquid crystal layer is, for example, a blue-phase liquid crystal polymer.

The above embodiments are used to explain the technical solutions according to the present invention; however, the present invention is not limited to the above-described specific structures. For example, the words "upper substrate", "lower substrate", "protruding upwardly", and "protruding downwardly" as above-described, all represent a relative positional relationship. For example, when the structure according to an embodiment of the present invention is rotated as a whole in a certain direction, the above-mentioned words which represent a relative positional relationship also should be altered correspondingly. For example, in the two electrodes on each substrate, the one close to the substrate is used as a common electrode, and the one away from the substrate is used as a pixel electrode. However, it is also possible that, the electrode close to the substrate is used as the pixel electrode, while the electrode away from the substrate is used as a common electrode. Further, in the above description and the drawings, it only illustrates the case that the strip-like sub-electrodes on the upper substrate and the lower substrate are provided oppositely; however, the strip-like sub-electrodes on the upper and the lower substrates may also be in a stagger manner along the arrangement direction of the strip-like sub-electrodes.

Based on the above description of the embodiments, the embodiments of the present invention can provide at least the following structures:

(1). A fringe-field-switching mode liquid crystal display panel, comprising:

a first substrate and a second substrate facing each other, and a liquid crystal layer sandwiched between the first substrate and the second substrate;

a first lower electrode, a first insulating layer and a first upper electrode, which are formed sequentially on a surface of the first substrate facing the second substrate; and a second lower electrode, a second insulating layer and a second upper electrode, which are formed sequentially on a surface of the second substrate facing the first substrate.

(2). The liquid crystal display panel according to (1), wherein, the first upper electrode comprises a plurality of strip-like first sub-electrodes parallel to each other and spaced from each other, and the second upper electrode comprises a plurality of strip-like second sub-electrodes parallel to each other and spaced from each other.

(3). The liquid crystal display panel according to (2), wherein, the extending direction of the first sub-electrodes on the first substrate is the same as the extending direction of the second sub-electrodes on the second substrate.

(4). The liquid crystal display panel according to any one of (1)-(3), wherein, the first lower electrode and the second lower electrode are common electrodes; and the first upper electrode and the second upper electrode are pixel electrodes.

(5). The liquid crystal display panel according to any one of (2)-(4), wherein, on the surface of the first substrate facing the second substrate, there are provided with a plurality of first supporting portions parallel to each other and protruding toward the second substrate, with first grooves being constituted between the adjacent first supporting portions; and the first supporting portions are provided between the first substrate and the first lower electrode.

(6). The liquid crystal display panel according to (5), wherein, the first sub-electrodes are provided corresponding to the first supporting portions; or, the first sub-electrodes are provided corresponding to the first grooves.

(7). The liquid crystal display panel according to any one of (2)-(4), wherein, on the surface of the second substrate facing the first substrate, there are provided with a plurality of second supporting portions parallel to each other and protruding toward the first substrate, with a second groove being constituted between the adjacent second supporting portions; and the second supporting portions are provided between the second substrate and the second lower electrode.

(8). The liquid crystal display panel according to (7), wherein, the second sub-electrodes are provided corresponding to the second supporting portions; or, the second sub-electrodes are provided corresponding to the second grooves.

(9). The liquid crystal display panel according to (5) or (6), wherein, on the surface of the second substrate facing the first substrate, there are provided with a plurality of second supporting portions parallel to each other and protruding toward the first substrate, with a second groove being constituted between the adjacent second supporting portions; and the second supporting portions are provided between the second substrate and the second lower electrode.

(10). The liquid crystal display panel according to (9), wherein, the second sub-electrodes are provided corresponding to the second supporting portions; or, the second sub-electrodes are provided corresponding to the second grooves.

(11). The liquid crystal display panel according to (9) or (10), wherein, the first supporting portions have a cross-section in a rectangular, trapezoidal, semicircular, triangular or semi-elliptical shape, and the second supporting portions have the same cross-sectional shape as the first supporting portions; and the second supporting portions are provided opposite to the first supporting portions, or, the second supporting portions are provided opposite to the first grooves.

(12). The liquid crystal display panel according to any one of (1)-(11), wherein, the first lower electrode, the first insulating layer, the second lower electrode and the second insulating layer each has a uniform layer thickness.

(13). The liquid crystal display panel according to any one of (1)-(12), wherein, the first insulating layer and the second insulating layer have a layer thickness in a range of 5000-10000 angstroms;

the first upper electrode and the second upper electrode have a layer thickness in a range of 300-2500 angstroms;

the liquid crystal layer has a layer thickness in a range of 5-20 microns.

(14). The liquid crystal display panel according to any one of (1)-(13), further comprising:

a first polarizer provided on the first substrate; and a second polarizer provided on the second substrate.

(15). The liquid crystal display panel according to any one of (1)-(14), wherein, the material of the liquid crystal layer is a blue-phase liquid crystal polymer.

What is claimed is:

1. A fringe-field-switching mode liquid crystal display panel with double-sided electrode structure, comprising:

a first substrate and a second substrate facing each other, and a liquid crystal layer sandwiched between the first substrate and the second substrate;

a plurality of first supporting portions, a first lower electrode, a first insulating layer and a first upper electrode, which are formed sequentially and conformingly or conformingly in part on a surface of the first substrate facing the second substrate; and a plurality of second supporting portions, a second lower electrode, a second insulating layer and a second upper electrode, which are formed sequentially and conformingly or conformingly in part on a surface of the second substrate facing the first substrate;

wherein the first upper electrode and the second upper electrode are formed facing each other on the first insulting layer and the second insulating layer, respectively, wherein the second upper electrode comprises a plurality of strip-like second sub-electrodes parallel to each other and spaced from each other, and the second sub-electrodes are disposed directly above the second supporting portions, wherein the plurality of first supporting portions are parallel to each other and protrude toward the second substrate, and a plurality of first grooves are provided with each of the first grooves being provided between any two adjacent first supporting portions, and wherein the first upper electrode comprises a plurality of strip-like first sub-electrodes parallel to each other and spaced from each other, the plurality of strip-like first sub-electrodes are provided within every other one of the plurality of first grooves with one strip-like first sub-electrode being provided within one first groove along an entire inner wall and bottom thereof.

2. The liquid crystal display panel according to claim 1, wherein the extending direction of the first sub-electrodes on the first substrate is the same as the extending direction of the second sub-electrodes on the second substrate.

3. The liquid crystal display panel according to claim 1, wherein the first lower electrode and the second lower electrode are common electrodes, and the first upper electrode and the second upper electrode are pixel electrodes.

4. The liquid crystal display panel according to claim 1, wherein the plurality of second supporting portions are parallel to each other and protrude toward the first substrate, with a second groove being provided between any two adjacent second supporting portions.

5. The liquid crystal display panel according to claim 1, wherein the plurality of first supporting portions have a cross-section in a rectangular, trapezoidal, semicircular, triangular or semi-elliptical shape, and the plurality of second supporting portions have the same cross-sectional shape as the plurality of first supporting portions; and the plurality of second supporting portions are provided opposite to the plurality of first supporting portions, or, the plurality of second supporting portions are provided opposite to the first grooves.

6. The liquid crystal display panel according to claim 1, wherein the first lower electrode, the first insulating layer, the second lower electrode and the second insulating layer each has a uniform layer thickness.

7. The liquid crystal display panel according to claim 1, wherein the first insulating layer and the second insulating layer have a layer thickness in a range of 5000-10000 angstroms;

the first upper electrode and the second upper electrode have a layer thickness in a range of 300-2500 angstroms; and the liquid crystal layer has a layer thickness in a range of 5-20 microns.

8. The liquid crystal display panel according to claim 1, further comprising:

a first polarizer provided on the first substrate; and a second polarizer provided on the second substrate.

9. The liquid crystal display panel according to claim 1, wherein material of the liquid crystal layer is a blue-phase liquid crystal polymer.

10. The liquid crystal display panel according to claim 1, wherein, as to any two adjacent second supporting portions, one has one strip-like second sub-electrode provided thereon, and the other has no strip-like second sub-electrode provided thereon.

* * * * *